(12) United States Patent
Gargov

(10) Patent No.: US 12,717,057 B2
(45) **Date of Patent: *Aug. 25, 2026**

(54) METAL DETECTOR

(71) Applicant: Tarsacci, LLC, Merced, CA (US)

(72) Inventor: Dimitar Gargov, Merced, CA (US)

(73) Assignee: Tarsacci LLC, Merced, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/184,324

(22) Filed: Feb. 24, 2021

(65) Prior Publication Data

US 2022/0268961 A1 Aug. 25, 2022
US 2023/0037278 A9 Feb. 2, 2023

Related U.S. Application Data

(63) Continuation of application No. 16/408,459, filed on May 9, 2019, now Pat. No. 10,969,512.

(60) Provisional application No. 62/673,021, filed on May 17, 2018.

(51) Int. Cl.
*G01V 3/10* (2006.01)

(52) U.S. Cl.
CPC .................................... *G01V 3/107* (2013.01)

(58) Field of Classification Search
CPC .......... G01V 3/10; G01V 3/101; G01V 3/102; G01V 3/104; G01V 3/105; G01V 3/107; G01V 3/108; G01V 3/15; G01V 3/165
See application file for complete search history.

(56) References Cited

U.S. PATENT DOCUMENTS 4,110,679 A * 8/1978 Payne .................... G01V 3/107 324/329
4,628,265 A * 12/1986 Johnson ................. G01V 3/107 324/225
10,969,512 B2 * 4/2021 Gargov .................. G01V 3/165
2002/0163346 A1 11/2002 Arndt et al.
(Continued)

FOREIGN PATENT DOCUMENTS

WO WO 2019/222067 11/2019

OTHER PUBLICATIONS

Robert Keim, Understanding Low-Pass Filter Transfer Functions, Technical Article from AllAboutCircuits.com, obtained from https://www.allaboutcircuits.com/technical-articles/understanding-transfer-functions-for-low-pass-filters/, article dated May 17, 2019 (Year: 2019).*

(Continued)

*Primary Examiner* — David M Schindler
(74) *Attorney, Agent, or Firm* — Makoui Law, PC; Ali Makoui

(57) ABSTRACT

A metal detector detects when a target that is a desirable metal object is located within a medium. A signal is transmitted into the medium. A response signal is received from the medium. The response signal includes a secondary medium response signal from the medium and includes a secondary target response signal from the target when the target is located within the medium. The response signal is amplified to produce an amplified signal. Compensation circuitry perform transmit coil transfer function compensation on the amplified signal to produce a compensated signal. A notch module removes a resistive component of the secondary medium response signal from the compensated signal.

20 Claims, 3 Drawing Sheets

(56) References Cited

U.S. PATENT DOCUMENTS

| | | | | |
|---|---|---|---|---|
| 2007/0046288 | A1* | 3/2007 | Westersten | G01V 3/105<br>324/326 |
| 2009/0243754 | A1 | 10/2009 | Conta et al. | |
| 2010/0019769 | A1* | 1/2010 | Candy | G01V 3/107<br>324/329 |
| 2012/0025815 | A1* | 2/2012 | Candy | G01V 3/104<br>324/239 |
| 2014/0347142 | A1 | 11/2014 | Chang et al. | |
| 2015/0268369 | A1* | 9/2015 | Dodds | G01V 3/10<br>324/334 |
| 2019/0353818 | A1* | 11/2019 | Gargov | G01V 3/10 |

OTHER PUBLICATIONS

Written Opinion of the International Searching Authority for PCT Application PCT/US2019/031893, dated Jul. 23, 2019, 9 pages.
International Search Report for PCT Patent Application PCT/US2019/031893, dated Jul. 23, 2019, 2 pages.
International Preliminary Report on Patentability for PCT Application PCT/US2019/031893, dated Nov. 17, 2020, 10 pages.
Office Action for U.S. Appl. No. 16/408,459, dated Sep. 29, 2020, 16 pages.
Response to Office Action for U.S. Appl. No. 16/408,459, dated Oct. 19, 2020, 11 pages.
Notice of Allowance for U.S. Appl. No. 16/408,459, dated Dec. 9, 2020, 8 pages.
Issue Notification for U.S. Appl. No. 16/408,459, dated Mar. 17, 2021, 1 page.
Annotated claim amendments for European Patent Application No. 19803062.9, dated Dec. 15, 2020, 6 pages.
Clean version of claims of European Patent Application No. 19803062.9, dated Dec. 15, 2020, 6 pages.
Communication regarding the transmission of the European search report for European Patent Application No. 19803062.9, dated Jan. 24, 2022, 1 page.
Information on Search Strategy for European Patent Application No. 19803062.9, dated Jan. 24, 2022, 1 page.
Supplementary European search report for European Patent Application No. 19803062.9, dated Jan. 24, 2022, 1 page.
Invitation to correct deficiencies reported in the Written Opinion of European Patent Application No. 19803062.9, dated Oct. 2, 2022, 1 page.
Intention of grant for European Patent Application No. 19803062.9, dated Sep. 29, 2023, 5 pages.

* cited by examiner

300
Medium
301
302
303
304
5
6
4
305
Receive Coil
3
2
100
1
Transmit Coil
Search Sensor
1010
101
41
42
20
7
51
52
102
54
8
53
103
129
61
127
130
128
62
8a
7a
51a 52a
53a
102a
103a
129a
127a
61a
130a
128a
62a
8n
7n
51n 52n
53n
102n
103n
129n
127n
61n
130n
128n
62n
70
ADC
90
Indicator Module
80
S7
S7a
S7n
DSP & Control Module
30
Timing Generator
125n
124n
125a
124a
126
120
121
124
125

126
201
200
t 100
201
202
t 124
201
203
t 125
201
204
t 120
201
206
205
t

METAL DETECTOR

BACKGROUND

Metal detectors exist in a variety of forms and are designed to detect desirable metal objects, herein referred to as targets. These include hand-held battery operated metal detectors, vehicle mounted metal detectors, walk through metal detectors and so on. A typical metal detector has a search sensor composed of a transmit coil and a receive coil. In some metal detectors a single coil acts as both the transmit coil and the receive coil. The transmit coil generates a time-varying magnetic field signal which excites various targets such as coins, mines, artifacts and so on that are buried in mediums such as soil, salt water beaches, clay, black sand and so on. In response to a transmitted magnetic field signal, targets generate secondary magnetic fields. Further, a medium that is conductive, magnetic, or conductive and magnetic will also generate its own secondary magnetic field in response to the transmitted magnetic field signal. The physics is well noun.

The receive coil picks up a response signal that is a function of the sum of the secondary magnetic fields from the target and the medium. Signal processing on the response signal is performed to produce an alert output to an operator to indicate when a desirable target is detected.

The parameters of the response signal are affected by a variety of factors including target and medium transfer functions, distance from the search sensor, parameters of search sensor coils, generated transmit magnetic field, and frequency of transmit signal and so on. The parameters of search sensor coils include, for example dimensions of the coils, number of turns, coil DC resistance and so on.

DETAILED DESCRIPTION

A target's electromagnetic behavior can be modeled with a target transfer function which is represented as a sum of a target magnetic component transfer function and a target resistive component transfer function. Likewise, a medium electromagnetic behavior can be modeled with a medium transfer function which is represented as a sum of a medium magnetic component transfer function and a medium resistive component transfer function. The response signal from a target will be a sum of target magnetic and target resistive components. The medium response signal will be a sum of medium magnetic and medium resistive components. When the medium is uniform, there is a correlation between the resistive and the magnetic components of the medium response signal. This makes it relatively easy to compensate or remove the undesired medium signal. When the medium is not uniform, there may be little or no correlation between the resistive and magnetic components of the medium response signal. If the undesirable medium signal is not removed or compensated for, the performance of the metal detector may suffer by producing false positive outputs to the operator, reducing the detectable range of a desired target, completely masking a secondary target signal or resulting in incorrect target identification.

Figure 1:
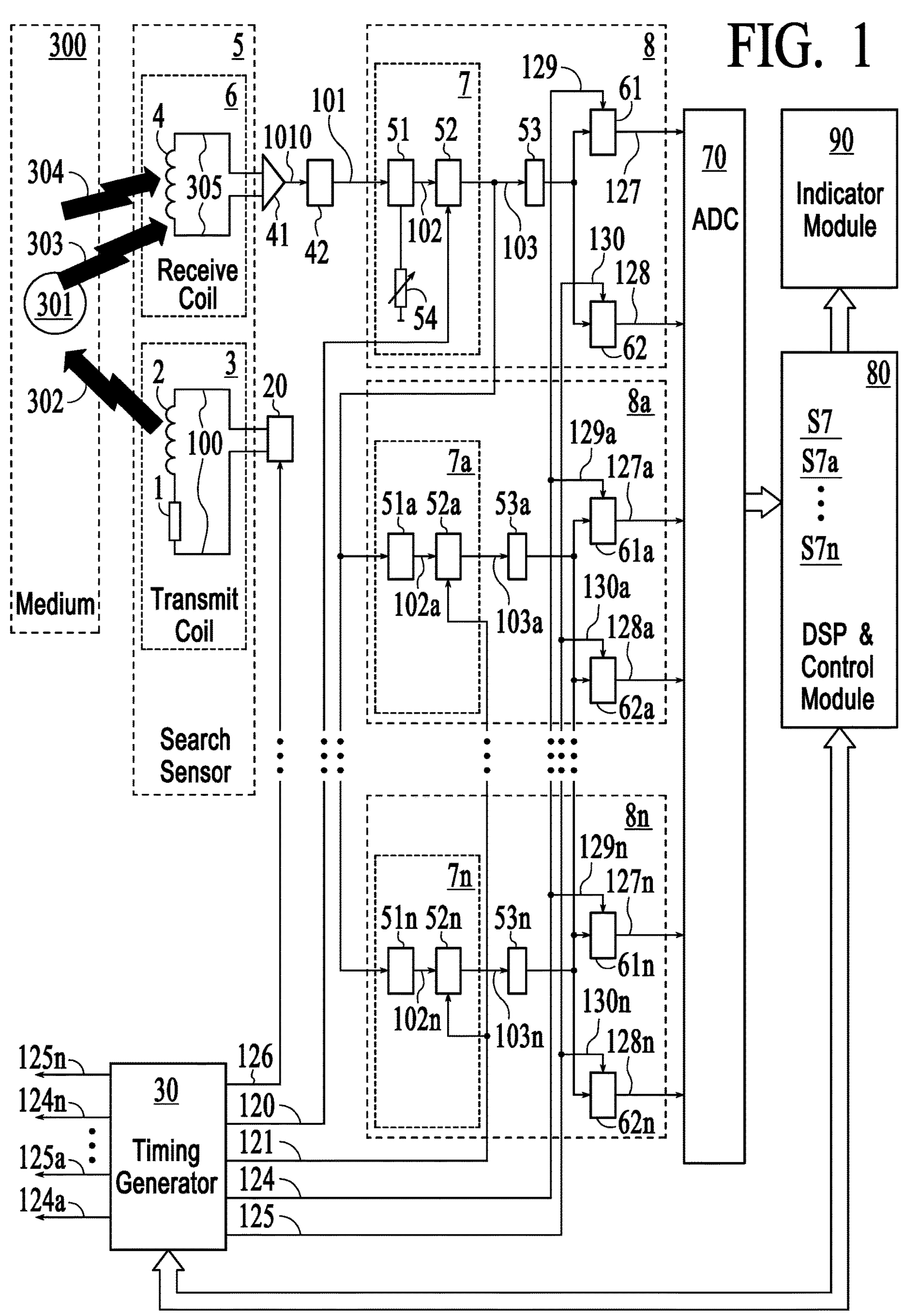
FIG. 1 is a block diagram of a metal detector.

FIG. 1 shows a simplified block diagram for a metal detector. The metal detector uses a medium resistive component inverse transfer function to compensate for the medium resistive component and uses preset target resistive component inverse transfer functions to properly identify the target.

The metal detector signal processing applies the preset medium resistive component inverse transfer function ($1/W_{mr}$) to the signal received by the metal detector's receiver and processes it in a time domain manner to compensate and remove the medium's resistive component from the signal received by the metal detector's receiver. The response signal is demodulated with vector resistive, denoted R, and vector reactive, denoted X, quadrature synchronous demodulators to be analyzed in the frequency domain and to remove the medium's magnetic component. The R demodulator is most sensitive to the purely resistive secondary field and the X demodulator is most sensitive to the purely reactive secondary field components for the demodulator's reference signal frequency. The phase reference signals frequency of the R and X demodulators can be the fundamental or harmonic frequency of the metal detector excitation signal as required to analyze the response signal vector at that frequency in the frequency domain. Multiple parallel channels with transfer functions the same as the inversed target resistive component transfer function and different discrete preset timing constants can be used to improve the target identification. Processing the received signal in both the time domain and the frequency domain provides the advantages of time domain metal detectors such as good immunity to high mineralize ground, salt water, red clay and so on, and provides the advantages of frequency domain metal detector such as fast response time, good target separation, noise immunity, precise target identification and so on.

Specifically, FIG. 1 shows that the metal detector includes a search sensor 5 that has a transmitter component composed of a transmit coil 3 and a receiver component composed of a receive coil 6. For example, in FIG. 1, transmit coil 3 is modeled as an effective transmit coil inductive component 2 in series with a resistive component 1. Resistive component 1 is the sum of the transmit coil DC resistance, search sensor cable DC resistance and a voltage power amplifier 20 output resistance. For example, a typical range for inductance ($L_{tc}$) of effective transmit coil inductive ($L_{tc}$) component 2 is 200 Microhenry (μH) to 1000 μH. A typical range for resistance ($R_{tc}$) of resistive component 1 is 0.5 Ohms to 2.0 Ohms.

Voltage power amplifier 20, connected to transmit coil 3, generates a voltage signal that results in an excitation signal 100 that emanates from transmit coil 3 to produce an alternating magnet field 302. Alternating magnetic field 302 induces voltage in a target 301 and induces voltage in a medium 300. The induced voltage in target 301 and medium 300 generate a secondary target magnetic field 303 and a secondary medium magnetic field 304. A timing generator 30 presents a bipolar square waveform system excitation signal 126 to voltage power amplifier 20 that voltage power amplifier 20 amplifies to produce excitation signal 100. For illustration, FIG. 1 shows a target 301 within medium 300.

Figures 2, 3, 4, 5, 6:
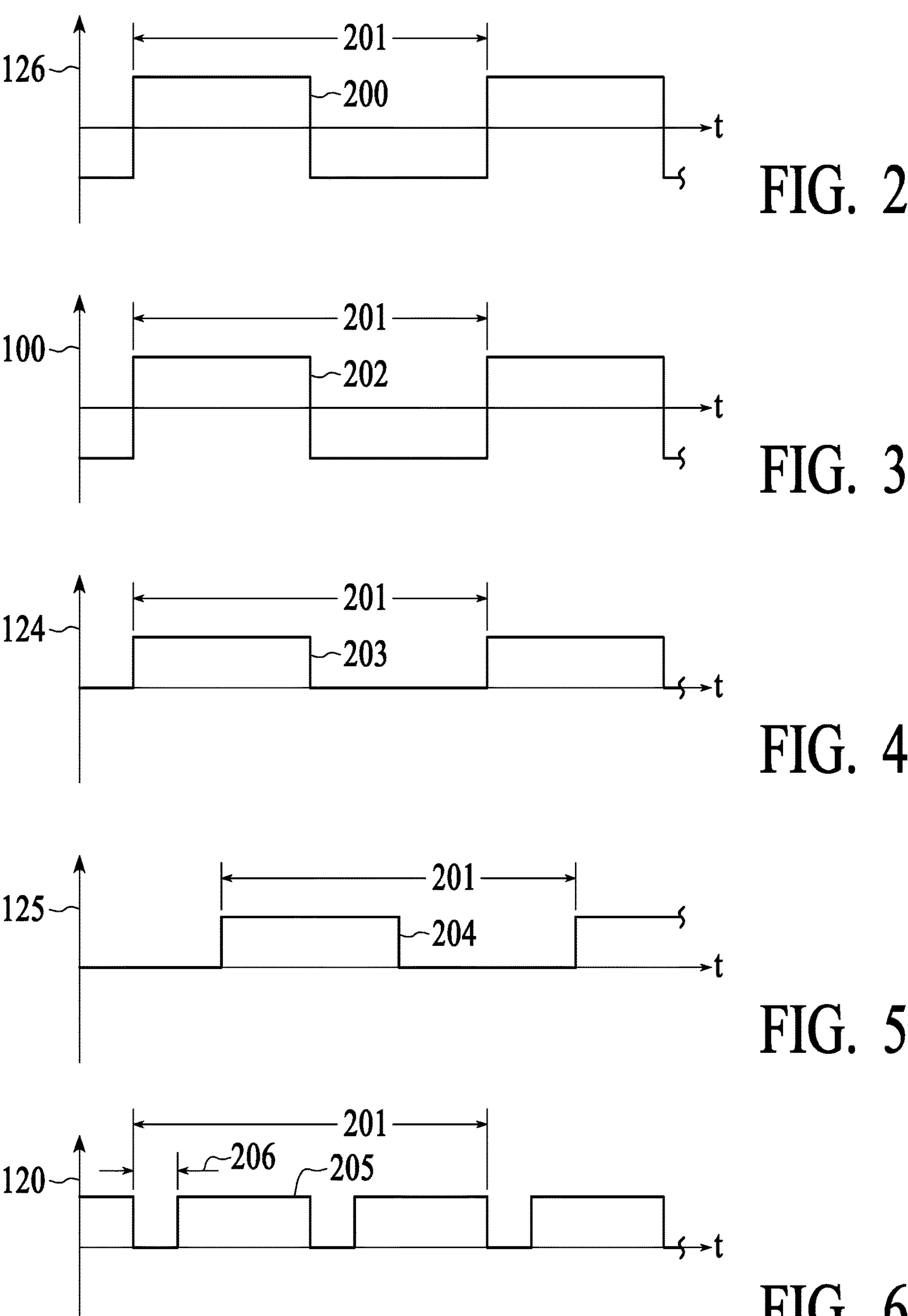
FIG. 2, FIG. 3, FIG. 4, FIG. 5, FIG. 6, FIG. 7, FIG. 8, FIG. 9, FIG. 10, and FIG. 11, illustrate waveforms of different metal detector signals resulting from a bipolar square waveform excitation signal and the presence of medium and target.

FIG. 2 shows an example waveform 200 of bipolar square waveform system excitation signal 126. Waveform 200 has a period with duration 201.

FIG. 3 shows an example waveform 202 of excitation signal 100. Waveform 202 also has a period with duration 201. The waveform of excitation signal can vary from what is shown in FIG. 3. For example, excitation signal 100 can have, a square waveform, a bipolar square waveform, a rectangular waveform, a multilevel rectangular waveform or another type of waveform.

As shown in FIG. 1, a receive coil 6 has an inductive component 4. The induced voltage, response signal 305, in receive coil 6 inductive component 4 is a product of the alternating magnetic field generated by transmit coil 3. This is a sum of the secondary target magnetic field 303 and the secondary medium magnetic field 304. A pre-amplifier 41 amplifies response signal 305 and forwards an amplified signal 1010 to compensation circuitry 42. Compensation circuitry 42 includes transmit coil transfer function compensation electronics that produce a detected signal 101.

Figures 7, 8, 9, 10, 11:
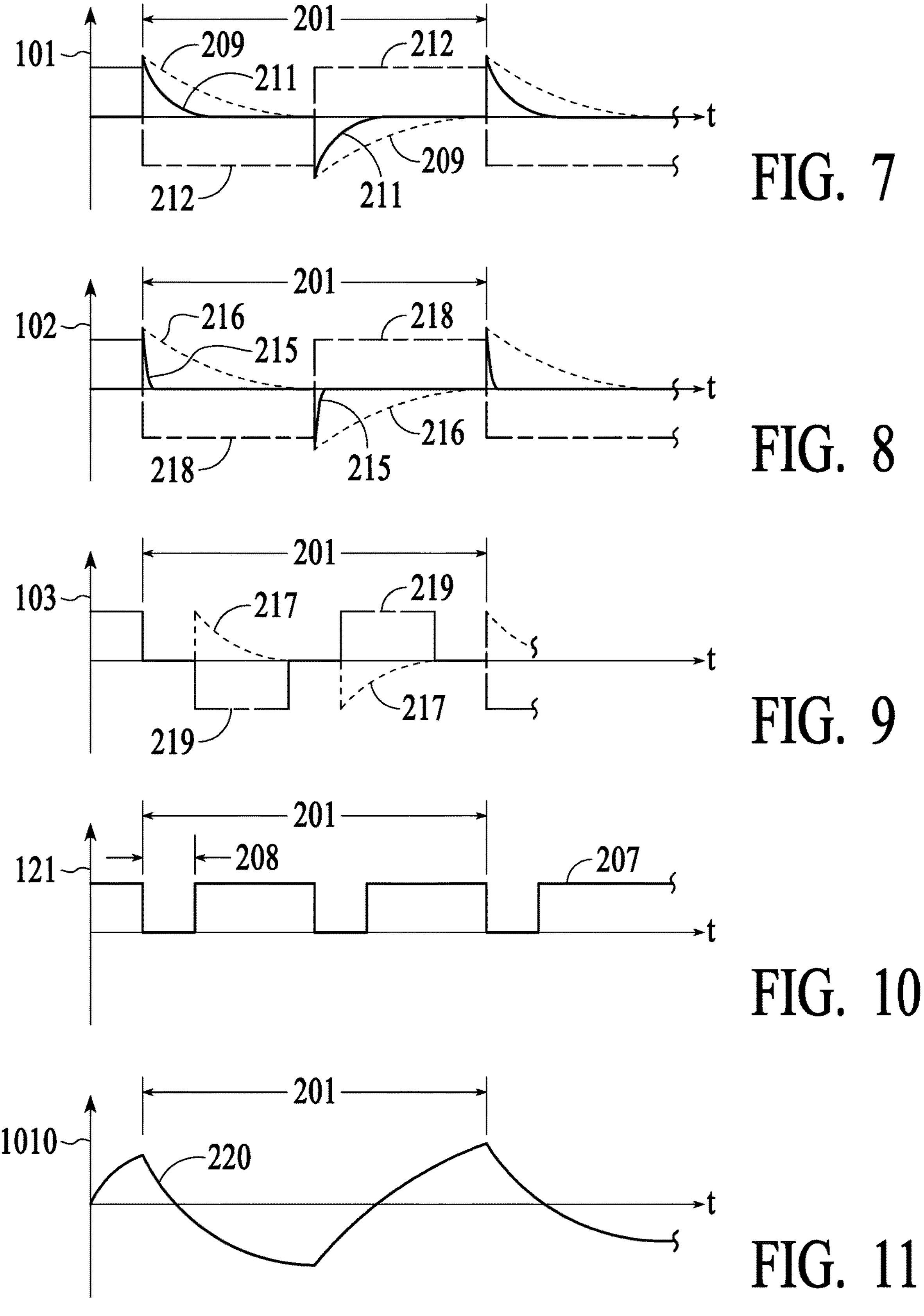

For example, FIG. 11 shows an example waveform 220 for amplified signal 1010.

For example, FIG. 7 shows waveform examples for detected signal 101 illustrating metal detector response to secondary target magnetic field 303 and secondary medium magnetic field 304 at compensation circuitry 42 output. For better illustration, the resistive and magnetic components of medium and target waveforms are separated. A waveform 211 represents the response from the medium resistive component ($M_{mr}$). A waveform 212 represents the response from the medium magnetic component ($M_{mm}$). Waveform 209 represents the non-ferrous target response. For simplicity of representation, in this example, the target is non-ferrous (target magnetic component is zero).

As shown in FIG. 1, a metal detector module 8 includes a notch module 7. Notch module 7 is used to filter out the medium resistive component from detected signal 101. Notch module 7 includes medium resistive component compensation electronics 51, with a transfer function the same as the medium's resistive component inverse transfer function and adjustable timing constant, and a gate 52. A regulator 54 is used to adjust the medium resistive component compensation circuit 51 preset timing constant ($T_{mrc}$) to the medium resistive component transfer function timing constant. Medium resistive component compensation circuit 51 generates an output signal 102.

FIG. 8 shows example waveforms for output signal 102. The waveforms includes target waveform 216 that represents the secondary magnetic field from the target, includes medium resistive component waveform 215 that represents the resistive component ($M_{mr}$) for the medium and includes medium magnetic component waveform 218 that represents the magnetic component ($M_{mm}$) for the medium.

Timing generator 30 generates a gate control signal 120 to control gate 52 in order to produce gate output signal 103. When gate control signal 120 is high, control gate 52 is open and output signal 102 passes through control gate 52. When gate control signal 120 is Low, output signal 102 is blocked. A noise rejection low pass filter 53 filters gate output signal 103. For example, noise rejection low pass filter 53 has a cutoff frequency between 60 kHz and 70 kHz.

FIG. 6 shows an example waveform 205 for digital control signal 120. In waveform 205, each falling edge is aligned with a transition (either a falling edge or a rising edge) of waveform 200 for bipolar square waveform system excitation signal 126, shown in FIG. 2. In waveform 205, a falling edge is followed by a rising edge after digital control signal time width 206.

FIG. 9 shows sample waveforms for gate output signal 103. The waveforms includes target waveform 217 that represents the secondary magnetic field from the target and includes medium magnetic component waveform 219 that represents the magnetic component ($M_{mm}$) for the medium.

Metal detector module 8 also includes quadrature signal 103 vector resistive (R) and reactive (X) components synchronous demodulators consisting of a vector resistive (R) component demodulator 61 and a vector reactive (X) component demodulator 62. Noise rejection low pass filter 53 forwards the filtered signal to signal's vector resistive component demodulator 61 and a signal's vector reactive component demodulator 62. Demodulator 61 and demodulator 62 each include a low pass filter (LPF) with, for example, a 15 Hz to 20 Hz cutoff frequency. The low pass filters within demodulator 61 and demodulator 62 filter all undesirable products from the demodulation process. Timing generator 30 provides an in-phase (with signal 126 with waveform 200) reference signal 124 with waveform 203 received on an input 129 of demodulator 61 and a quadrature to signal 126 with waveform 200 reference signal 125 with waveform 204 received on an input 130 of demodulator 62. Demodulator 61 produces an output signal 127 that is proportional to the vector resistive component of gate output signal 103, for gate output signal 103 having a fundamental frequency with a period duration 201. Demodulator 62 produces an output signal 128 that is proportional to the vector reactive component for gate output signal 103 fundamental frequency with a period duration 201.

FIG. 4 shows an example waveform 203 of in-phase reference signal 124. FIG. 5 shows an example waveform 204 quadrature reference signal 125. Both, waveform 202 and waveform 203 have a period with duration 201.

A multi-channel analog-to-digital converter (ADC) 70 digitizes output signals from demodulator 61 and demodulator 62 to provide digitized signals for further signal processing by a digital signal processor (DSP) and control module 80.

An indicator module 90, connected to DSP and control module 80, produces a desirable metal detected signal to the operator when a desired target is detected. In some embodiments timing generator 30 can be incorporated into DSP and control module 80.

For example, introducing multiple modules with transfer functions with preset timing constants and analyzing the modules composite signals increases resolution used in determination of a timing constant ($T_t$) for the target resistive component transfer function and allows identification of the target.

This is illustrated in FIG. 1 by a metal detector module **8*a* and a metal detector module 8*n* which represent any number of multiple modules 8*a* . . . 8*n* with the internal target resistive component notch modules 7*a* . . . 7*n*. The modules 7*a* . . . 7*n* target resistive component compensation circuits 51*a* . . . 51*n* transfer function is the target resistive component inversed transfer function and different preset timing constants T51*a* . . . T51*n***. Analyzing the composite signals S7*a* . . . S7*n* product of the module's **8*a* . . . 8*n*** outputs, allows determination of the timing constant ($T_t$) for the target and the target identification.

FIG. 1 shows gate output signal 103 providing input to target resistive component compensation circuit **51*a* of a notch module 7*a* within metal detector module 8*a* and providing input to target resistive component transfer function compensation circuit 51*n* of a notch module 7*n* within metal detector module 8*n*. Notch module 7*a* is used to filter out target's resistive component with a transfer function timing constant equal to target resistive component compensation circuit 51*a* transfer function preset timing constant, still present in gate output signal 103. Likewise, notch module 7*n* is used to filter out another target's resistive component with a transfer function timing constant equal to the target resistive component compensation circuit 51$n$ transfer function preset timing constant, still present in gate output signal 103**.

Timing generator 30 generates a digital gate control signal 121 to control a gate 52$a$ in order to produce gate output signal 103$a$ and to control a gate 52$n$ in order to produce gate output signal 103$n$. When gate control signal 121 is high, the gates are open and signals pass through the gates. When gate control signal 121 is Low the signals are blocked.

FIG. 10 shows an example waveform 207 for digital control signal 121 used to control gates 52$a$ . . . 52$n$. Every falling edge for waveform 207 for digital control signal 121 is aligned with a corresponding falling edge of waveform 205 for digital control signal 120, shown in FIG. 6. In waveform 207, a falling edge is followed by a rising edge after a time duration 208 where time duration 208 greater than digital control signal time width 206 of waveform 205.

A noise reduction low pass filter (LPF) 53$a$ input receives gate output signal 103$a$ from gate 52$a$ output. For example, LPF 53$a$ has a cutoff frequency between 60 kHz and 70 kHz. An output of LPF 53$a$ is used to drive quadrature, Ra and Xa, synchronous demodulators 61$a$ and 62$a$. Timing generator 30 provides in-phase reference signal 124 received on an input 129$a$ of demodulator 61$a$ and quadrature reference signal 125 received on an input 130$a$ of demodulator 62$a$. Demodulator 61$a$ produces an output signal 127$a$ that is proportional to signal 103$a$ vector resistive component of gate output signal 103$a$. Demodulator 62$a$ produces an output signal 128$a$ that is proportional to signal 103$a$ vector reactive component.

While FIG. 1 shows the timing generator 30 providing fundamental transmit signal frequency quadrature reference signal pair 124 and 125 to demodulator 61$a$ and demodulator 62$a$, instead one of the transmit signal harmonics frequency quadrature reference signal pairs may be provided. Demodulators 61$a$ and 62$a$ include a low pass filter (LPF) with, for example, a 15 Hz to 20 Hz cutoff frequency. Demodulators 61$a$ and 62$a$ LPF filter all undesirable products from the demodulation process. For example, transmit signal harmonics frequency quadrature reference signal pairs being generated by timing generator 30 are represented in FIG. 1 by transmit signal harmonics frequency quadrature reference signal pair 124$a$ and 125$a$, and by transmit signal harmonics frequency quadrature reference signal pair 124$n$ and 125$n$.

A noise reduction LPF 53$n$ input receives gate output signal 103$n$ from gate 52$n$ output. An output of LPF 53$n$ is used to drive quadrature, Rn and Xn, synchronous demodulators 61$n$ and 62$n$. Demodulators 61$n$ and 62$n$ include a low pass filter (LPF) with, for example, a 15 Hz to 20 Hz cutoff frequency. Demodulators 61$n$ and 62$n$ LPF filter all undesirable products from the demodulation process. Timing generator 30 provides an in-phase reference signal 124$n$ received on an input 129$n$ of demodulator 61$n$ and a quadrature reference signal 125$n$ received on an input 130$n$ of demodulator 62$n$. Demodulator 61$n$ produces an output signal 127$n$ that is proportional to the vector resistive component of gate output signal 103$n$. Demodulator 62$n$ produces an output signal 128$n$ that is proportional to the vector reactive component.

While FIG. 1 shows the timing generator 30 providing fundamental transmit signal frequency quadrature reference signal pair 124 and 125 to demodulator 61$n$ and demodulator 62$n$, instead one of the transmit signal harmonics frequency quadrature reference signal pairs may be supplied. These are represented in FIG. 1 by transmit signal harmonics frequency quadrature reference signal pair 124$a$ and 125$a$, and by transmit signal harmonics frequency quadrature reference signal pair 124$n$ and 125$n$.

For example, each of metal detector modules 8$a$ . . . 8$n$ are identical modules with different target resistive component compensation circuits 51$a$ . . . 51$n$ preset timing constants T51$a$ . . . T51$n$ as determined by target resistive component compensation circuits 51$a$ . . . 51$n$. The parallel connection arrangement of metal detector modules 8$a$ . . . 8$n$ improves target resistive component identification resolution. The metal detector modules 8$a$ . . . 8$n$, inputs are connected to gate output signal 103, free of the medium resistive component, and outputs 127$a$ . . . 127$n$ and outputs 128$a$ . . . 128$n$ are all connected to the multi-channel ADC 70 for digitizing.

The number of modules can be varied to give sufficient resolution for an intended target. For example, when the target is a coin three to four metal detector modules 8$a$ . . . 8$n$ with different timing constants T51$a$ . . . T51$n$ provides resolution sufficient for a good target identification where, T51$a$<T51$b$< . . . <T51$n$, and where timing constants T51$a$ . . . T51$n$ are in range of 10 Microseconds (μS) to 200 μS.

DSP and control module 80 evaluates digitized signals resulting from multi-channel ADC 70. The signals are analyzed as a system of transfer functions. For example, for detecting coin targets, transmit signal fundamental frequency of excitation signal 100 can be in range of 5 KHz to 30 KHz.

The metal detector, target and the medium will be analyzed as a system. An example analysis follows for a bipolar square waveform system excitation signal 126 with a presence of medium 300 and target 301. To simplify the analysis, the receive electronics finite frequency and the finite impulse response time are neglected. Equation 1 below represents voltage $U_{101}$ in complex form for detected signal 101. Excitation signal 100 with voltage $U_{100}$ and a bipolar square waveform is the system excitation signal. The medium's transfer function is represented as a sum of the $W_{mr}$ medium resistive component transfer function multiplied by the medium resistive component coupling coefficient $K_{mr}$ and the medium magnetic component transfer function $W_{mm}$ multiplied by the medium magnetic component coupling coefficient $K_{mm}$. The target transfer function is represented as a sum of the target resistive component transfer function $W_{tr}$ and the target magnetic component transfer function $W_{tm}$ multiplied by the target coupling coefficient $K_t$.

$$U_{101} = sU_{100}K_s W_{tcc} W_{tc}[(W_{tr}+W_{tm})K_t + W_{mr}K_{mr} + W_{mm}K_{mm}] \quad \text{Equation 1}$$

$$\text{For } W_{tcc} = \frac{1}{W_{tc}}$$

$$U_{101} = sU_{100}K_s[(W_{tr}+W_{tm})K_t + W_{mr}K_{mr} + W_{mm}K_{mm}] \quad \text{Equation 2}$$

$$U_{102} = sU_{100}K_s[W_{mrc}(W_{tr}+W_{tm})K_t + W_{mr}W_{mrc}K_{mr} + W_{mm}W_{mrc}K_{mm}] \quad \text{Equation 3}$$

$$\text{For } W_{mrc} = \frac{1}{W_{mr}}$$

$$U_{102} = sU_{100}K_s W_{mrc} K_t (W_{tr}+W_{tm}) + sU_{100}K_s K_{mr} + sU_{100}K_s W_{mm} W_{mrc} K_{mm} \quad \text{Equation 4}$$

$$U_{mrpr} = sU_{100}K_s K_{mm} \quad \text{Equation 5}$$

$$U_{mmpr} = sU_{100}K_s W_{mm} W_{mrc} K_{mm} \quad \text{Equation 6}$$

-continued $$U_{103} = sU_{100}K_s W_{mrc} K_t (W_{tr} + W_{tm}) + sU_{100} K_s K_{mm} W_{mm} W_{mrc} \quad \text{Equation 7}$$

$$W_{trc} = \frac{1}{W_{tr}} \quad \text{Equation 8}$$

In Equations 1 through 8 above, the following notation is used:

$W_{tc}$=1/(sTtc+1)–transmit coil transfer function with timing constant $T_{tc}=L_{tc}/R_{tc}$;

$W_{tcc}$—transmit coil compensation electronic 42 transfer function;

$W_{mr}$—Medium resistive component transfer function;

$W_{mm}$—Medium magnetic component transfer function;

$K_{mr}$—Medium resistive component coupling coefficient $K_{mm}$—Medium magnetic component coupling coefficient $W_{m}$—Medium resistive component compensation electronics 51 transfer function;

$W_{tr}$—Target resistive component transfer function;

$W_{tm}$—Target magnetic component transfer function $W_{trc}$—Target resistive component compensation electronics 51*a* . . . 51*n* transfer function $K_t$—Target coupling coefficient $K_s$—System gain;

s—Complex frequency variable.

To eliminate the transmit coil transfer function influence, the $W_{tc}$ is preset to $$W_{tcc} = \frac{1}{W_{tc}}$$

and the result for $U_{101}$ is Equation 2 (practical values for Ttc are between 400 and 1000 uS). Voltage $U_{102}$ for output signal 102 is given in Equation 3 with a waveform such as that shown in FIG. 7. The resistive component compensation transfer function for medium 300 timing constant is preset in medium resistive component compensation circuit 51 with regulator 54 to be equal to the medium resistive component timing constant $$W_{mrc} = \frac{1}{W_{mr}}$$

and the result for $U_{102}$ is shown calculated by Equation 4.

The product of the medium restive component $U_{mrpr}$ is calculated in Equation 5 as a derivative with only $U_{100}$ as a variable. For $U_{100}$ with a fast transients bipolar square waveform and due to finite $U_{100}$ transient time, finite system frequency response, system finite response time, and the $W_{mrc}$ is not exactly equal to $$\frac{1}{W_{mr}},$$

the $U_{mmpr}$ will have a fast decaying waveform. The result is medium waveform 215 for output signal 102, as shown in FIG. 8. For the cases where $U_{100}$ has a square waveform, a rectangular waveform, or a multilevel rectangular waveform, the result will be the same.

In order to completely remove the resistive component for medium 300, gate 52 has to be closed for a short period of time, for example, 2 micro seconds (uS) to 4 uS. This is illustrated in FIG. 6 for gate 52, digital control signal 120 waveform 205 has a falling edge aligned with every signal 126 transient and digital control signal time width 206.

Gate output signal 103, generated by gate 52, is free of the resistive component of medium 300. Equation 7 is an approximate equation for voltage $U_{103}$ for gate output signal 103. The remaining medium magnetic component $U_{mmpr}$, represented in Equation 6, is nulled by summing the weighted reactive vector component (output signal 128) and the resistive component (output signal 127), in the frequency domain. The resulted composite signal S7 will indicate the target presence. Signal S7 is an internal signal for module 80. The signal's 103 vector phase provides the target identification (ID) information.

The input to notch module 7*a* is gate output signal 103, which will be free of the resistive component from medium 300. The target resistive component compensation circuit 51*a* transfer function Equation 8 is inversed target's resistive component transfer function with preset timing constant T51*a*.

If the resistive component transfer function for target 301 timing constant is equal to the target resistive component compensation circuit 51*a* transfer function timing constant T51*a* for target resistive component compensation circuit 51*a*, the output response to the target's resistive component (due to: finite $U_{100}$ transient time, finite system frequency response, system finite response time) will have a fast decaying waveform. To completely remove it, the gate 52*a* has to be closed for a short time duration 208 as illustrated in FIG. 10 and as controlled by digital control signal 121. The time duration 208 is larger than digital control signal time width 206 by one to three Microseconds. Nulling the remaining medium magnetic component is done by summing the weighted reactive vector component (signal 128*a*) and the resistive component (signal 127*a*) for metal detector module 8*a*. The resulted composite signal S7*a* will be free of the magnetic component for medium 300. The composite signal S7*a* for targets with a resistive component transfer function timing constant $T_t$ will be:

A: T51*a*>$T_t$==negative

B: T51*a*=$T_t$==zero

C: T51*a*<$T_t$==positive.

In this way multiple modules 8*a* . . . 8*n* with preset timing constants T51*a* . . . T51*n* and analyzing the modules composite signals S7*a* . . . S7*n* allows determination of the timing constant $T_t$ range and the identification of target 301.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A metal detector for detecting a target, that is a desirable metal object, within a medium, the metal detector comprising:

a transmitter comprising a transmit coil, the transmitter configured to transmit an excitation signal into the medium;

a receiver configured to receive a response signal from the medium, the response signal comprising a secondary medium response signal from the medium and a secondary target response signal from the target;

a preamplifier configured to amplify the response signal to produce an amplified signal;

compensation circuitry configured to perform transmit coil transfer function compensation on the amplified signal to produce a compensated signal comprising the secondary medium response signal from the medium and the secondary target response signal from the target, wherein the secondary medium response signal from the medium comprises a resistive component and a magnetic component, and wherein the secondary target response signal from the target comprises a resistive component and a magnetic component;

a timing generator; and a notch module configured to remove the resistive component of the secondary medium response signal from the compensated signal to produce a notch module output signal, wherein the notch module includes:

a medium resistive component transfer function compensation circuit configured to have a transfer function to be equal to an inverse of the transfer function of the resistive component of the medium, wherein the medium resistive component transfer function compensation circuit is configured to receive the compensated signal and reduce the resistive component of the secondary medium response signal in the compensated signal to a fast decaying remnant of the resistive component of the secondary medium response signal in an output signal of the medium resistive component transfer function compensation circuit; and a gate configured to receive the output signal of the medium resistive component transfer function compensation circuit and produce the notch module output signal, wherein the timing generator is configured to generate a control signal aligned with the excitation signal's rising edge and falling edge transients to open and close the gate to remove the remnant of the resistive component of the secondary medium response signal from the notch module output signal.

2. The metal detector of claim 1 further comprising:

a low pass filter configured to perform low pass filtering on the notch module output signal to produce a filtered signal;

a signal vector resistive component demodulator configured to produce a vector resistive component output signal from the filtered signal;

a vector reactive component demodulator configured to produce a vector reactive component output signal from the filtered signal;

an analog-to-digital converter configured to digitize the vector resistive component output signal and the vector reactive component output signal to produce digital signals; and a digital signal processor configured to process the digital signals.

3. The metal detector of claim 1, wherein the receiver comprises a receive coil.

4. The metal detector of claim 2, wherein the timing generator is configured to provide timing signals to a power amplifier for the transmitter, the notch module, the signal vector resistive component demodulator, and the vector reactive component demodulator.

5. A metal detector for detecting a target, that is a desirable metal object, within a medium, the metal detector comprising:

a transmitter configured to transmit a signal into the medium;

a receiver configured to receive a response signal from the medium, the response signal including a secondary medium response signal from the medium and includes a secondary target response signal from the target;

a preamplifier configured to amplify the response signal to produce an amplified signal;

compensation circuitry configured to perform transmit coil transfer function compensation on the amplified signal to produce a compensated signal;

a first notch module configured to remove a resistive component of the secondary medium response signal from the compensated signal to produce a first notch module output signal;

a low pass filter configured to perform low pass filtering on the first notch module output signal to produce a filtered signal;

a first signal vector resistive component demodulator configured to produce a first vector resistive component output signal from the filtered signal;

a first vector reactive component demodulator configured to produce a first vector reactive component output signal from the filtered signal;

an analog-to-digital converter configured to digitize the first vector resistive component output signal and the first vector reactive component output signal to produce first digital signals;

a digital signal processor configured to process the first digital signals;

a second notch module configured to remove a resistive component of the secondary target response signal from the first notch module output signal to produce a second notch module output signal;

a second signal vector resistive component demodulator configured to produce a second vector resistive component output signal from the second notch module output signal; and a second vector reactive component demodulator configured to produce a second vector reactive component output signal from the second notch module output signal;

wherein the analog-to-digital converter is configured to digitize the second vector resistive component output signal and the second vector reactive component output signal to produce second digital signals.

6. The metal detector of claim 5, further comprising:

a third notch module configured to remove a resistive component of the secondary target response signal from the first notch module output signal to produce a third notch module output signal;

a third signal vector resistive component demodulator configured to produce a third vector resistive component output signal from the third notch module output signal; and a third vector reactive component demodulator configured to produce a third vector reactive component output signal from the third notch module output signal;

wherein the analog-to-digital converter is configured to digitize the third vector resistive component output signal and the third vector reactive component output signal to produce third digital signals.

7. The metal detector of claim 5, wherein the second notch module comprises:

a target resistive component transfer function compensation circuit; and a gate, the gate and the target resistive component transfer function compensation circuit configured to remove the resistive component of the secondary target response signal from the first notch module output signal.

8. The metal detector of claim 5, further comprising:

a timing generator configured to provide timing signals to a power amplifier for the transmitter, the first notch module, the first signal vector resistive component demodulator, the first vector reactive component demodulator, the second notch module, the second signal vector resistive component demodulator, and the second vector reactive component demodulator.

9. The metal detector of claim 5, further comprising:

a low pass filter configured to perform low pass filtering on the second notch module output signal to filter the second notch module output signal prior to the second notch module output signal being received by the second signal vector resistive component demodulator and the second vector reactive component demodulator.

10. The metal detector of claim 1, wherein the first notch module further comprises:

a regulator configured to adjust a timing constant of the medium resistive component transfer function compensation circuit to a timing constant of the transfer function of the resistive component of the medium.

11. A method for detecting a target, that is a desirable metal object within a medium, the method comprising:

transmitting, by a transmitter comprising a transmit coil, an excitation signal into the medium;

receiving a response signal from the medium, the response signal comprising a secondary medium response signal from the medium and a secondary target response signal from the target;

amplifying the response signal to produce an amplified signal;

performing, by a compensation circuitry, transmit coil transfer function compensation on the amplified signal to produce a compensated signal comprising the secondary medium response signal from the medium and the secondary target response signal from the target, wherein the secondary medium response signal from the medium comprises a resistive component and a magnetic component, and wherein the secondary target response signal from the target comprises a resistive component and a magnetic component; and removing the resistive component of the secondary medium response signal from the compensated signal by a notch module to produce a notch module output signal, wherein removing the resistive component of the secondary medium response signal from the compensated signal by the notch module comprises:

receiving, by a medium resistive component transfer function compensation circuit, the compensated signal;

reducing, by the medium resistive component transfer function compensation circuit, the resistive component of the secondary medium response signal in the compensated signal to a decaying remnant of the resistive component of the secondary medium response signal in an output signal of the medium resistive component transfer function compensation circuit, receiving, by a gate, the output signal of the medium resistive component transfer function compensation circuit; and producing, by the gate, the notch module output signal, wherein a timing generator generates a control signal aligned with the excitation signal's rising edge and falling edge transients to open and close the gate to remove the remnant of the resistive component of the secondary medium response signal from the notch module output signal.

12. The method of claim 11 further comprising:

producing, by a signal vector resistive component demodulator, a vector resistive component output signal from the notch module output signal;

producing, by a vector reactive component demodulator a vector reactive component output signal from the notch module output signal;

digitizing the vector resistive component output signal and the vector reactive component output signal to produce digital signals; and processing the digital signals by a digital signal processor.

13. The method of claim 11 further comprising:

performing low pass filtering on the notch module output signal.

14. The method of claim 11:

wherein transmitting the signal is performed using the transmit coil; and wherein receiving the response signal is performed using a receive coil.

15. The method of claim 11 further comprising:

providing, by the timing generator, timing signals to a power amplifier for transmitting the signal, the notch module, the signal vector resistive component demodulator, and the vector reactive component demodulator.

16. The method of claim 11 further comprising:

adjusting, by a regulator, a timing constant of the medium resistive component transfer function compensation circuit to a timing constant of the transfer function of the resistive component of the medium.

17. A method for detecting a target, that is a desirable metal object, within a medium, the method comprising:

transmitting a signal into the medium;

receiving a response signal from the medium, the response signal comprising a secondary medium response signal from the medium and a secondary target response signal from the target;

amplifying the response signal to produce an amplified signal;

performing, by compensation circuitry, transmit coil transfer function compensation on the amplified signal to produce a compensated signal;

removing a resistive component of the secondary medium response signal from the compensated signal by a first notch module to produce a first notch module output signal;

producing, by a first signal vector resistive component demodulator, a first vector resistive component output signal from the first notch module output signal;

producing, by a first vector reactive component demodulator, a first vector reactive component output signal from the first notch module output signal;

digitizing the first vector resistive component output signal and the first vector reactive component output signal to produce digital signals;

processing the digital signals by a digital signal processor;

removing a resistive component of the secondary target response signal from the first notch module output signal by a second notch module;

producing a second vector resistive component output signal from output of the second notch module; and producing a second vector reactive component output signal from the output of the second notch module.

18. The method of claim 17 further comprising:

removing an additional resistive component of the secondary target response signal from the first notch module output signal by a third notch module;

producing a third vector resistive component output signal from output of the third notch module; and producing a third vector reactive component output signal from the output of the third notch module.

19. The method of claim 17, wherein removing the resistive component of the secondary target response signal from the first notch module output signal by the second notch module is performed using a target resistive component transfer function compensation circuit and a gate.

20. The method of claim 17 further comprising:

providing, by a timing generator, timing signals to a power amplifier for transmitting the signal, the first notch module, the first signal vector resistive component demodulator, the first vector reactive component demodulator, and the second notch module.

* * * * *